April 22, 1952  R. C. HOFFMAN  2,593,883
AUTOMOBILE BODY
Filed Jan. 28, 1948  2 SHEETS—SHEET 2
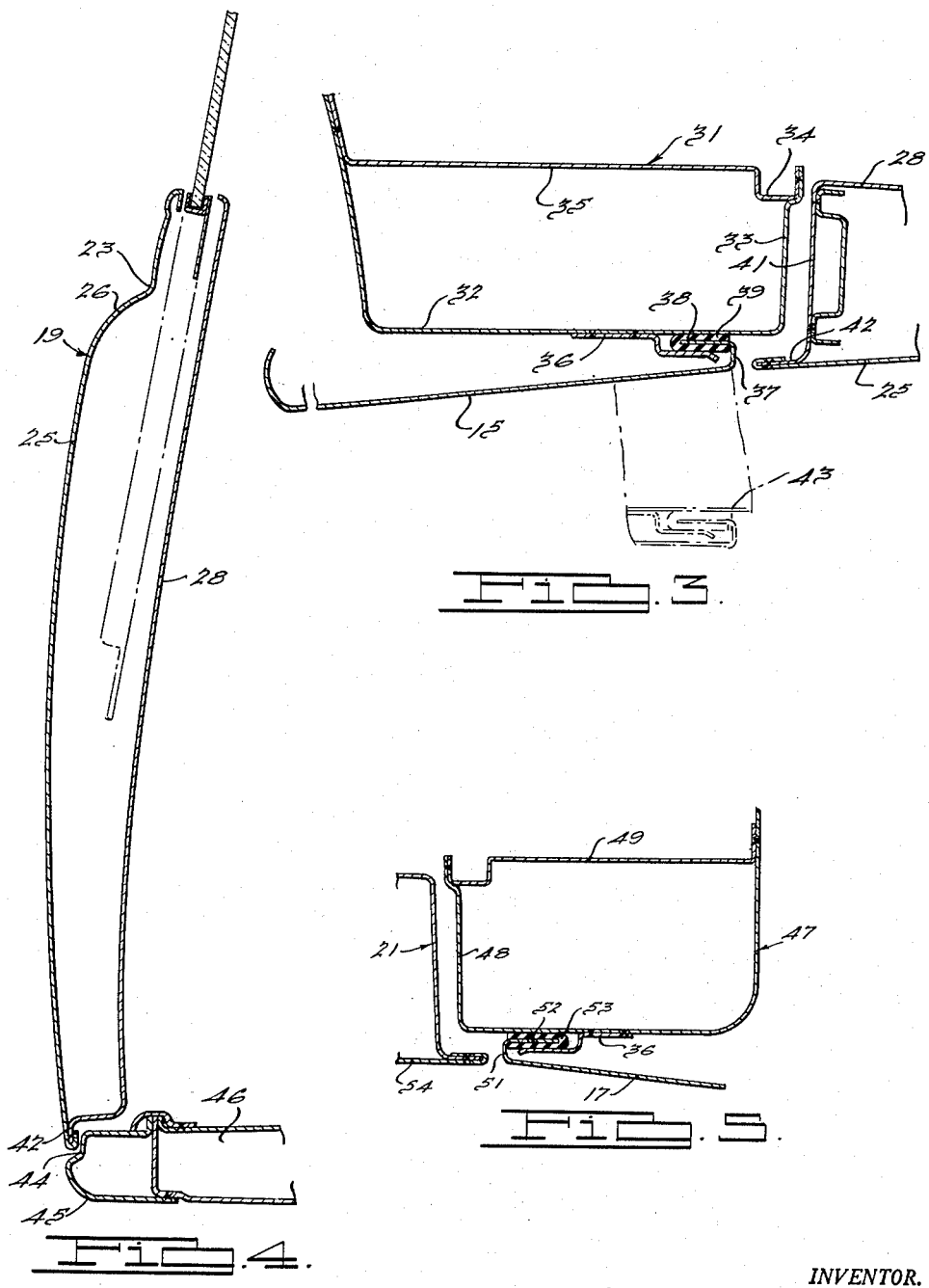
INVENTOR.
Roscoe C. Hoffman.
BY
Harness, Dickey & Pierce.
ATTORNEYS.

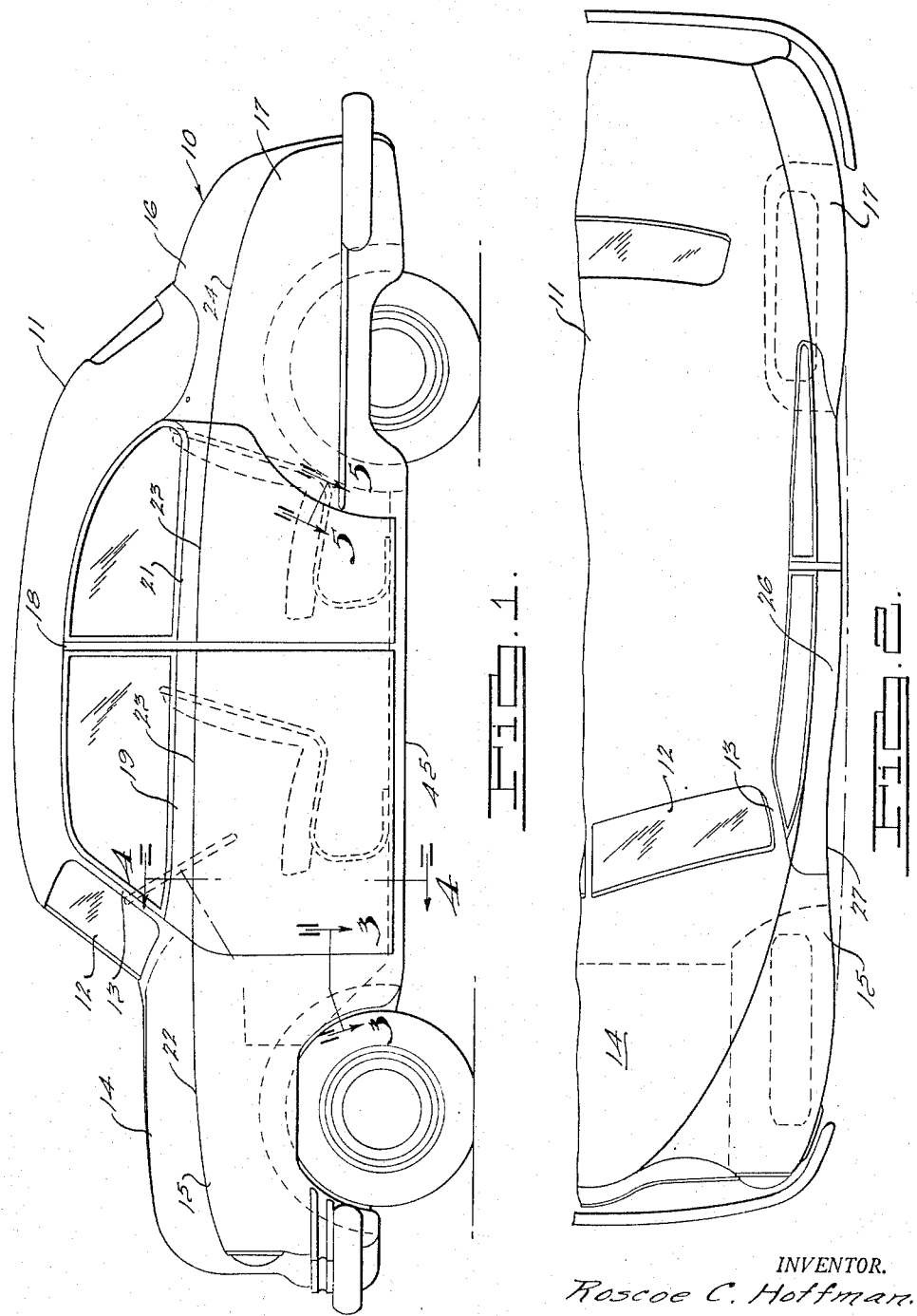

UNITED STATES PATENT OFFICE 2,593,883

AUTOMOBILE BODY

Roscoe C. Hoffman, Detroit, Mich.

Application January 28, 1948, Serial No. 4,817

1 Claim. (Cl. 296—28)

This invention relates to automobiles and particularly to a passenger body for an automotive vehicle.

In view of the trend of the automobile body art in widening the passenger carrying compartment thereof a maximum amount while retaining the streamlined form of the body and in carrying the fender lines continuously across the belt line of the body, the pillar section at the front and rear has become extremely wide and cumbersome. In some of the bodies the pillar below the belt line in continuation of the fender extends between eight inches and ten inches in dimension transverse of the vehicle and provides an expensive and difficult structure to assemble.

The belt line is curved outwardly from the rear and the front to the center of the present day bodies, and it is one object of the present invention to change the sweep of the belt line at the body sides to have the line curve inwardly at each of the front and rear pillars, to thereby substantially reduce the width of the pillar at the belt line and therebelow while maintaining the continuous appearance of the belt line and fenders.

It is another object of the invention to have the fender at the front and rear of the body removable and secured to the pillar by suitable clips in alignment with the door overlap flange.

A further object of the invention is to substantially simplify the construction of the pillars at and below the belt line of the vehicle body at the forward and rear jamb of the door openings and to support the fenders on the pillars in removable relation to form rabbets for the door overlap flange.

Other objects and features of novelty of the invention will be specifically pointed out or will become apparent when referring for a better understanding of the invention to the following description, taken in conjunction with the accompanying drawings, wherein:

Figure 1 is a side view in elevation of a vehicle body embodying features of this invention.

Fig. 2 is a broken plan view of the body illustrated in Fig. 1;

Fig. 3 is an enlarged sectional view of the structure illustrated in Fig. 1, taken on the line 3—3 thereof;

Fig. 4 is an enlarged sectional view of the structure illustrated in Fig. 1, taken on the line 4—4 thereof, and Fig. 5 is an enlarged sectional view of the structure illustrated in Fig. 1, taken on the line 5—5 thereof.

Referring to the figures, a body 10 is illustrated having a top 11 which terminates at the forward end in a windshield 12 disposed between windshield pillar portions 13, hood 14, front fenders 15, rear and side quarter panels 16 and rear fenders 17. In the body herein illustrated, the opening below the roof is divided by a pillar 18 forming two door openings enclosed by a front door 19 and a rear door 21. The top line 22 of the front fenders is disposed in continuation of the belt line at 23, across the doors 19 and 21, and of the top line 24 of the rear fender 17.

As viewed in Fig. 4, the door panel 25 of the door 19 is formed outwardly at 26 to provide a bulge in the panel which aligns with the panel of the fender. It will be noted from Fig. 2 that the bulge 26 is substantially uniform from the plane of the door except at the front portion 27 which curves outwardly to meet the plane of the side wall of the fender 15. The distance between the outer panel 25 and the inner panel 28 of the door is substantially decreased over the greater width of the door by this diverging of the panel at the front door edge.

The windshield pillar portions 13 have reinforcing therein contained (not illustrated) which extends from a lower pillar portion 31, as illustrated in Fig. 3. The pillar portion 31 embodies a wheel housing stamping 32 having a flange 33 forming the front door jamb which is welded to a flange of a tacking strip receiving channel 34 of a reinforcing stamping 35. The stampings 32 and 35 form a box-section construction extending from the floor up to the reinforced windshield pillar portions 13. On the outer side of the stamping 32 a plurality of clips 36 are welded or otherwise secured, to which the end of the front fenders 15 is releasably secured. The fenders are of conventional form with the exception that the edge adjacent to the door opening is flanged inwardly at 37 and reversely bent at 38 providing a flange over which a strip 39 of rubber or like sound-deadening material is secured in position to be moved forwardly in the space between the stamping 32 and the projecting end of the clips 36. Instead of a plurality of clips, a strip of material may be employed which is substantially the same length as the flange 38.

It will be noted in the figure that the inner panel 28 of the door forms the rail 41 and the overlapping flange 42 thereof. The front panel 25 curves outwardly to be in alignment with the side wall of the fender 15 and is reversely bent over the overlapping flange 42 to which it is secured by welding. By having the fender slope inwardly and the door panel slope outwardly in aligned relation, the pillar portion 31 is of narrow width reduced from the normal line 43 to which the stamping 32 would have extended in the conventional construction. The overlapping flange 42 extends across the bottom of the door and rests within a rabbet 44 in a sill 45 which curves inwardly at the forward and rearward pillars as illustrated in Fig. 2. The sill is supported on the outer edge of the floor structure 46 in the conventional manner.

Referring to Fig. 5, a rear wheel housing panel 47 has an inwardly presenting channel portion 48 which is spanned by a reinforcing panel 49 forming a box-section pillar construction, with the forward edge disposed in continuation of the side roof rails. This joining of the side roof rails to the lower pillar portion at the rear of the body is not herein illustrated as this may be accomplished in any manner now employed in the art. The rear fenders 17 slope inwardly toward the pillar portions at the sides of the body and have the forward end adjacent to the door opening bent inwardly at 51 and reversely bent at 52 forming a flange over which a strip 53 of rubber or like sound-deadening material is secured. Clips or a strip of material 36 is welded to the outer surface of the wheel housing panels 47 for receiving the strip 53 in the space between the clips or strip 36 and the outer surface of the panels. The fenders 15 and 17 are bolted at various points to the body remote from the pillars so that when the bolts are removed the movement of the fenders toward the door opening releases the reversely bent edge portion from the clips or strips 36 to permit the removal of the fenders from the body. It will be noted that the door 21 has the outer panel 54 disposed in alignment with the outwardly diverging side of the rear panels 17. By having the door panels 54 and fenders 17 diverge outwardly from the rear door pillar, the box-section structure formed by the channel portion 48 of the wheel housing panel 47 and the reinforcing panel 49 is of normal thickness transverse of the body as illustrated.

With the construction of the present body, the pillar portions below the belt line are substantially reduced in width and the fenders at the edges adjacent to the door openings are removably secured thereto in clips formed outwardly of the face of the pillars. This locates the side wall of the fenders in continuation of the door panels and provides a sinuous longitudinal form to the belt line of the body and the top of the fender, enhancing rather than detracting from the appearance of the resulting body sides.

What is claimed is:

In a vehicle body having openings in the sides for doors, a pillar portion at the forward end of the door extending upwardly from the floor to the belt line at both sides of the body, fenders at the front of the body having top contour lines disposed in continuation of the belt line of the body through the doors, the sides of the fenders and the door panels sloping inwardly toward a point on the door in the vicinity of the pillar portions to substantially reduce the width of the pillar portions and the thickness of the door transversely of the body, rear pillar portions at the door openings, and rear fenders at the rear of the body sloping inwardly to be in alignment with the inwardly sloping rear edge of the door panels to reduce the width of the pillar portions below the belt line at the rear edge of the door opening transversely of the body.

ROSCOE C. HOFFMAN.

REFERENCES CITED

The following references are of record in the file of this patent:

UNITED STATES PATENTS

| Number | Name | Date |
| --- | --- | --- |
| 1,523,263 | Henninger | Jan. 13, 1925 |
| 2,114,830 | Carr | Apr. 19, 1938 |
| 2,128,686 | Andreau | Aug. 30, 1938 |
| 2,284,988 | Reid | June 2, 1942 |
| 2,335,058 | Haltenberger | Nov. 23, 1943 |
| 2,404,870 | Ulrich | July 30, 1946 |